United States Patent [19]
Nakamura

[11] Patent Number: 6,151,388
[45] Date of Patent: Nov. 21, 2000

[54] COMMUNICATION CHARGE MANAGEMENT SYSTEM

[75] Inventor: Toshio Nakamura, Tokyo, Japan

[73] Assignee: NEC Corporation, Tokyo, Japan

[21] Appl. No.: 09/136,363

[22] Filed: Aug. 19, 1998

[30] Foreign Application Priority Data

Aug. 22, 1997  [JP]  Japan .................................. 9-225949

[51] Int. Cl.[7] ................................................ H04M 15/00
[52] U.S. Cl. .................... 379/114; 379/111; 379/132; 379/171; 379/156
[58] Field of Search ................... 379/111–114, 117–118, 379/140, 141, 156–157, 159, 161, 165, 167, 171–173, 177, 182, 183, 187, 133–134

[56] References Cited

U.S. PATENT DOCUMENTS

| | | | |
|---|---|---|---|
| 4,264,956 | 4/1981 | Delaney | 705/418 |
| 5,222,122 | 6/1993 | Hamilton et al. | 379/32 |
| 5,265,155 | 11/1993 | Castro | 379/112 |
| 5,960,416 | 9/1999 | Block . | |

FOREIGN PATENT DOCUMENTS

| | | |
|---|---|---|
| 53-132919 | 11/1978 | Japan . |
| 61-263355 | 11/1986 | Japan . |
| 61-290853 | 12/1986 | Japan . |
| 62-15961 | 1/1987 | Japan . |
| 62-219865 | 9/1987 | Japan . |
| 1-174056 | 7/1989 | Japan . |
| 1-243661 | 9/1989 | Japan . |
| 2-244964 | 9/1990 | Japan . |
| 4-181855 | 6/1992 | Japan . |
| 4-196956 | 7/1992 | Japan . |
| 5-284255 | 11/1993 | Japan . |

*Primary Examiner*—Duc Nguyen
*Attorney, Agent, or Firm*—McGuire Woods, LLP

[57] ABSTRACT

A communication charge management system includes one or more master telephone sets serving as managing telephone sets, one or more slave telephone sets serving as telephone sets managed by the master telephone sets, and a charge informing unit. The charge informing unit informs the master telephone set of the communication charge in communication of the slave telephone set.

10 Claims, 9 Drawing Sheets

19B₄

| FIRST MASTER-SUBSIDIARY GROUP 21₁ | | NTH MASTER-SUBSIDIARY GROUP 21ₙ | |
|---|---|---|---|
| FIRST SUBSIDIARY TELEPHONE SET | ¥500 | | |
| SECOND SUBSIDIARY TELEPHONE SET | ¥1,200 | ~ | |
| | | | |
| | | | |

TELEPHONE NUMBER OF
FIRST SUBSIDIARY TELEPHONE SET :   CHARGE ¥3,010 : 12 : 05, MARCH 1, 1997

FIG. 7

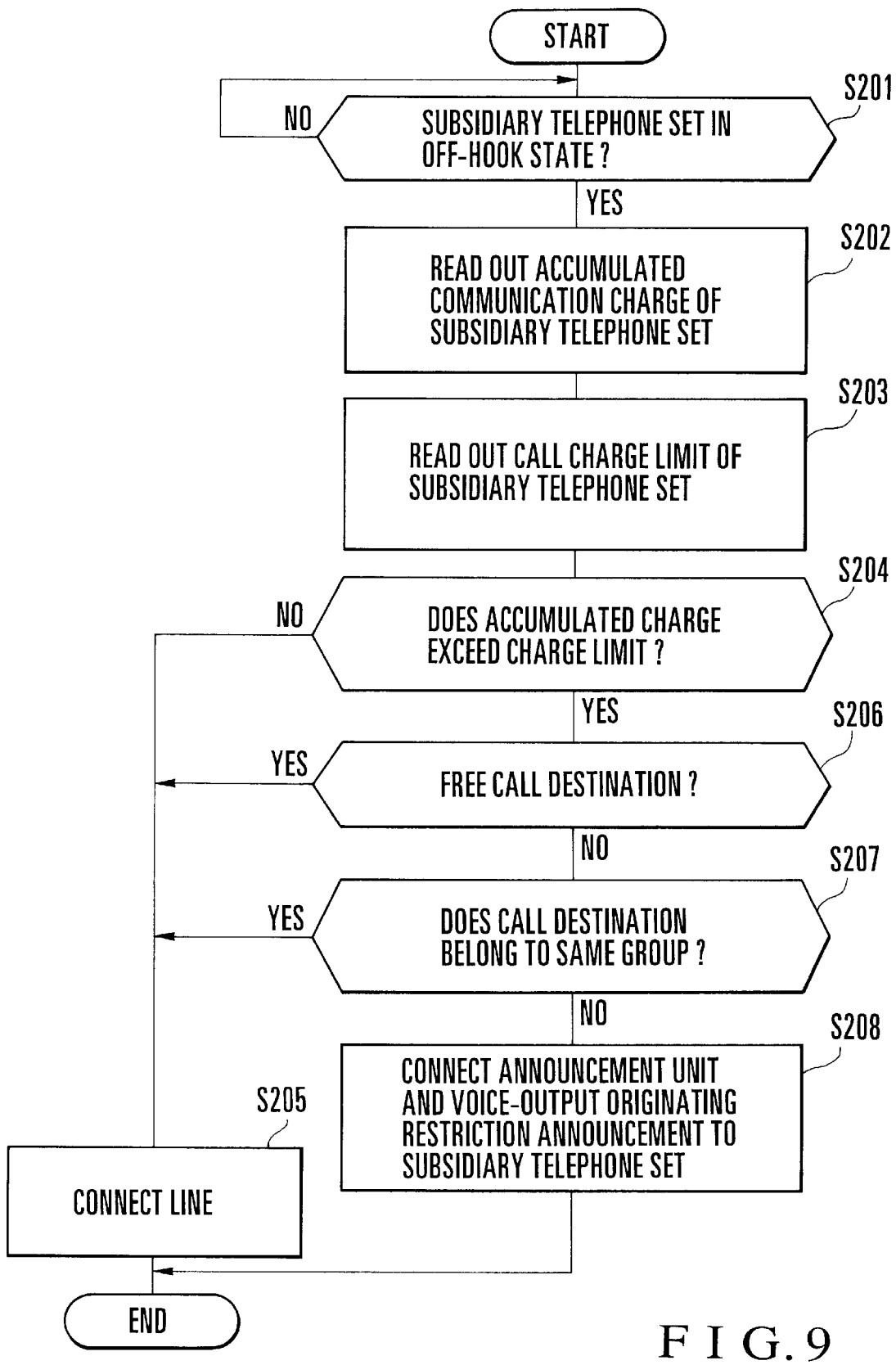
F I G. 9

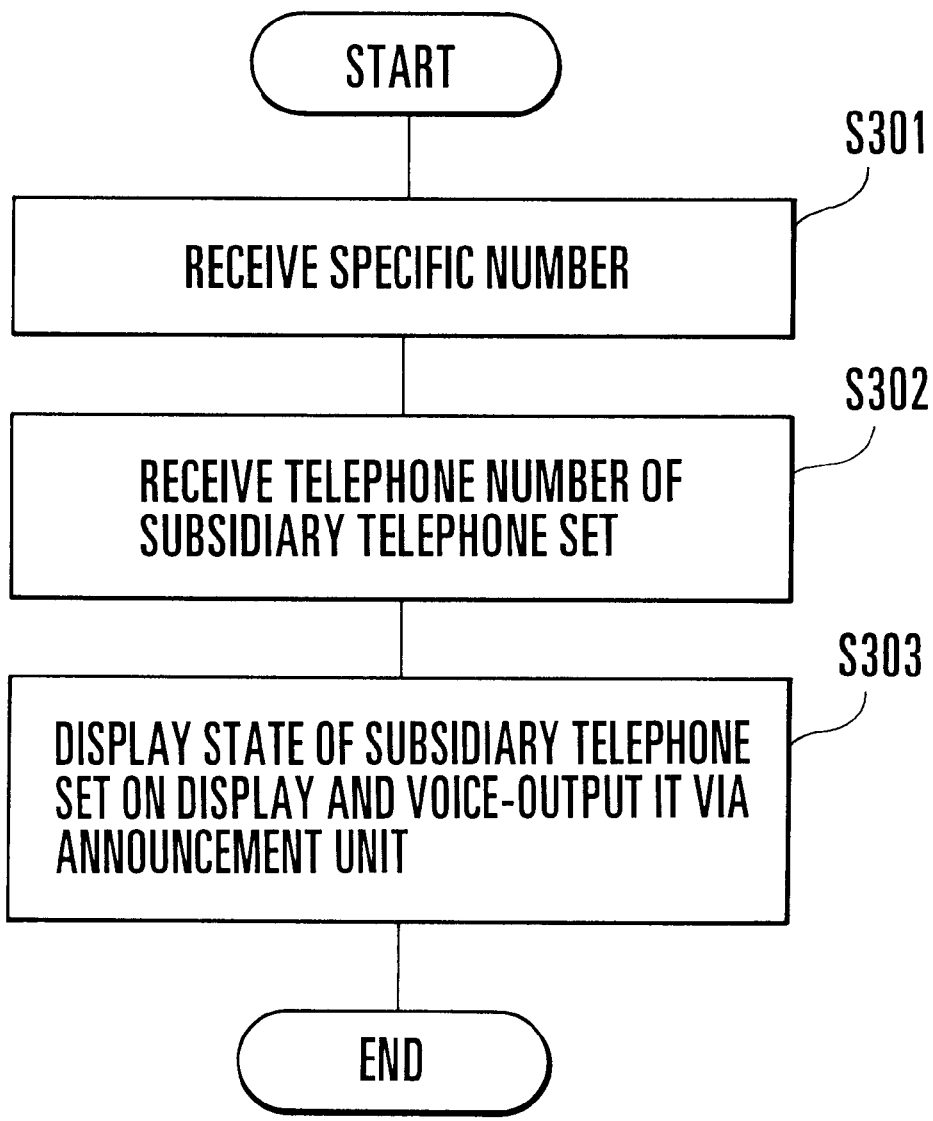
F I G. 10

COMMUNICATION CHARGE MANAGEMENT SYSTEM

BACKGROUND OF THE INVENTION

The present invention relates to a communication charge management system for managing the communication charge in units of telephone sets and, more particularly, to a communication charge management system in which a specific telephone set, i.e., a master telephone set manages the communication charge of the subsidiary telephone set.

Generally, in a public telephone set, the user pays the call or communication (to be referred to as communication hereinafter) charge by coins or a prepaid card every communication. In a general subscriber's telephone set, communication charges are accumulated in units of predetermined periods, e.g., in units of months, and the bill is issued to the subscriber after the predetermined period.

In the public telephone set, the communication charge is managed every communication, the user performs communication within the user's coins or prepaid card, and thus the communication charge does not become in a large sum. In the general subscriber's telephone set, however, since charges within a predetermined period are accumulated and made, a bill in a large sum may be issued after the predetermined period. Particularly when one telephone set is commonly used by a plurality of users, one telephone line is commonly used by a plurality of telephone sets, or the communication charges of telephone sets by different users are made to a representative subscriber, the communication charge in a large sum may be unexpectedly made.

To prevent this, according to the technique disclosed in Japanese Patent Publication No. 60-041503, a communication charge limit within a predetermined period is set for a switching unit in units of telephone sets or groups of specific telephone sets. When the communication charge exceeds the set charge limit before the predetermined period, an alarm sound that the communication charge exceeds the charge limit is generated to disconnect communication and restrict a subsequent outgoing call.

According to the technique disclosed in Japanese Patent Laid-Open No. 4-181855, the telephone set is operated to store the type of communication restriction such as call restriction, the communication restriction charge, or date & time information in the telephone set. When toll call restriction is set, a call to a toll area is restricted. When restriction for one call charge is set to prevent the charge for one call from exceeding a predetermined charge, the line is forcibly disconnected when the charge exceeds the set charge. In this technique, communication charge restriction can be set to limit the sum of past and current communication charges to a predetermined charge. Also in this case, the line is disconnected when the charge exceeds the predetermined charge.

Japanese Patent Laid-Open No. 62-15961 also discloses the technique of accumulating and managing communication charges. According to this technique, when a call is made to a specific telephone number, e.g., a telephone number dedicated for a specific individual (child), a long-time outgoing call can be disconnected.

According to the technique disclosed in Japanese Patent Laid-Open No. 5-284255, the ISDN (Integrated Service Digital Network) terminal is operated to store the charge limit and a telephone number subjected to originating restriction/originating restriction cancellation in the ISDN terminal. In the ISDN terminal, charges are accumulated every communication. When the accumulated charge exceeds a predetermined charge limit, an origination to a telephone number subjected to originating restriction is restricted but that to only a telephone number subjected to originating restriction cancellation is permitted.

According to the technique disclosed in Japanese Patent Laid-Open No. 61-263355, the digital telephone set is operated to store "communication charge limit for each local call", "communication charge limit for each toll call", "total communication charge limit of local calls", "total communication charge limit of toll calls", and "communication charge limit for each origination telephone number" in the telephone set. Whether the communication charge exceeds the charge limit is monitored based on the charge informed from the telephone network to the digital telephone set during or at the end of communication. When the communication charge exceeds the charge limit, the digital telephone set generates an alarm sound and disconnects the line.

Recently, portable telephones have become popular, and a plurality of telephone sets are owed by one family. Along with variations in individual information collection range and communication contents, each member of one family tends to own his/her own telephone set. In this situation, a specific individual (child) of the family makes a call or calls in a large sum, and as a result the subscriber (parent) receives a bill in a large sum.

To solve this problem, the subscriber must appropriately grasp the use states of a plurality of telephone sets within a specific group. However, the above conventional techniques can only manage the communication charge of a specific telephone set, or can only set the communication charge limit of the whole group and manage the charge. They cannot appropriately manage the communication charges for only telephone sets owed by individuals having a special relationship (master-slave relationship) such as the relationship between a subscriber (parent) and a specific individual (child).

SUMMARY OF THE INVENTION

It is an object of the present invention to provide a communication charge management system capable of appropriately managing the communication charge of a subsidiary telephone set as a slave by the master telephone set as a master in a plurality of telephone sets having a master-slave relationship.

It is another object of the present invention to provide a communication charge management system capable of appropriately managing the communication charge of a telephone set so as not to exceed the charge limit.

In order to achieve the above objects, according to the present invention, there is provided a communication charge management system comprising at least one master telephone set serving as a managing telephone set, at least one slave telephone set serving as a telephone set managed by the master telephone set, and charge informing means for informing the master telephone set of a communication charge in communication of the slave telephone set.

BRIEF DESCRIPTION OF THE DRAWINGS

FIG. 6 is a block diagram showing the arrangement of the fourth memory portion in the warning informing memory area;

FIG. 7 is a view showing an example of a display on the display of the master telephone set;

FIG. 9 is a flow chart showing control upon making a call by the subsidiary telephone set;

FIG. 10 is a flow chart showing processing when the master telephone set requests a connection controller to acquire information about a specific subsidiary telephone set;

DESCRIPTION OF THE PREFERRED EMBODIMENT

The present invention will be described in detail below with reference to the accompanying drawings.

Figure 1:
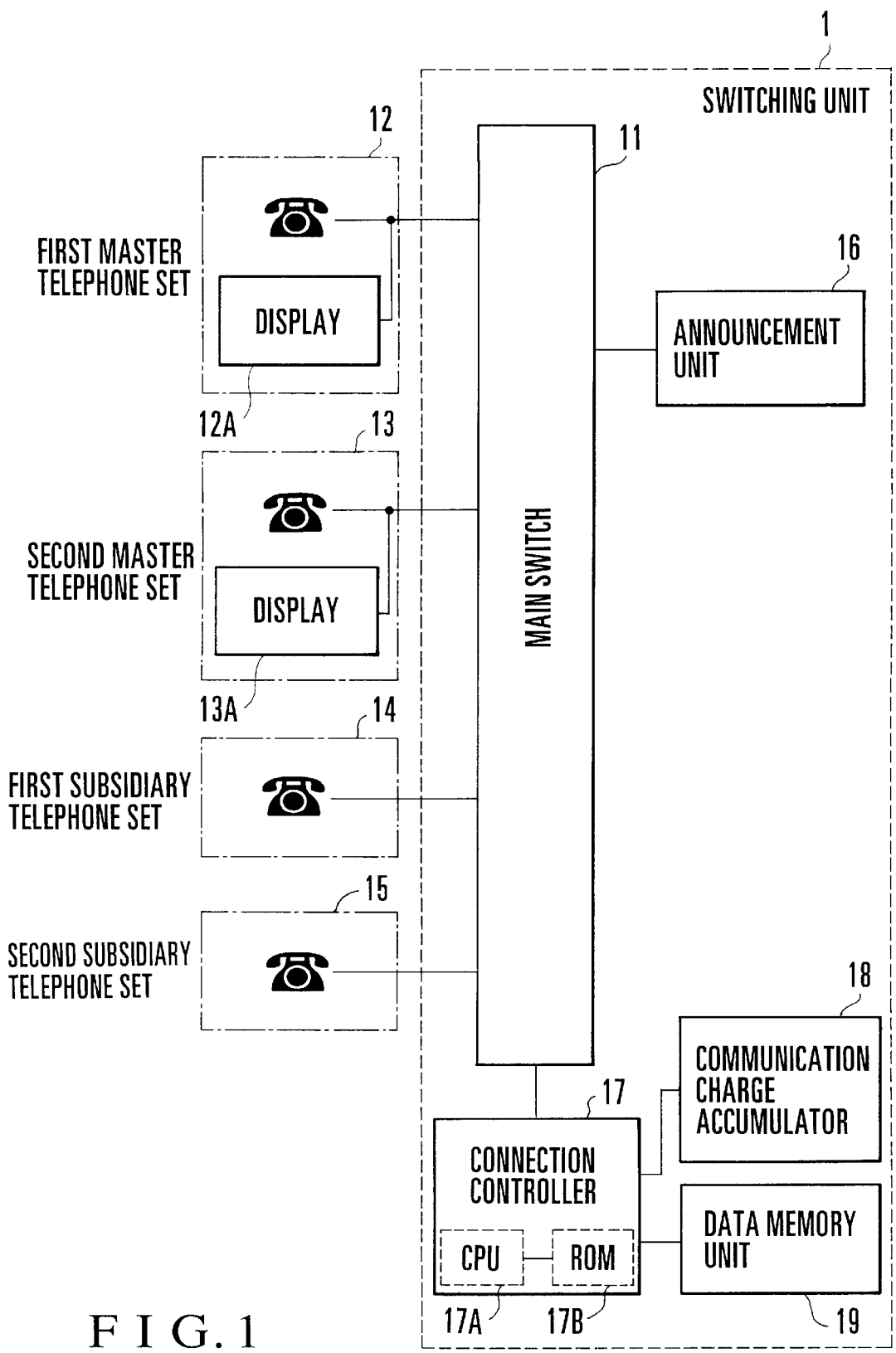
FIG. 1 is a block diagram showing the schematic arrangement of a communication charge management system according to an embodiment of the present invention.

FIG. 1 shows the schematic arrangement of a communication charge management system according to an embodiment of the present invention. In the communication charge management system shown in FIG. 1, a main switch 11 constituting a switching unit 1 is connected to first and second master telephone sets 12 and 13 having displays 12A and 13A capable of displaying characters and images, like a telephone set incorporating a personal computer, and first and second subsidiary telephone sets 14 and 15 constituted by general telephone sets having no display.

The main switch 11 is connected to an announcement unit 16 capable of sending several types of announcements, and a connection controller 17 for various control operations. The first and second master telephone sets 12 and 13 and the first and second subsidiary telephone sets 14 and 15 belong to a common group subjected to the same communication management. The connection controller 17 is connected to a communication charge accumulator 18 for individually accumulating the communication charges of the telephone sets 12 to 15, and a data memory unit 19 for storing predetermined data including the accumulated communication charge.

The main switch 11 is controlled by the connection controller 17 and connects the telephone sets 12 to 15.

The connection controller 17 comprises a CPU (Central Processing Unit) 17A and a ROM (Read Only Memory) 17B in which various types of programs are stored. The CPU 17A controls the main switch 11 and executes switching such as connection/disconnection of a line in accordance with the programs stored in the ROM 17B on the basis of dial information and the like received from the telephone sets 12 to 15.

The communication charge accumulator 18 accumulates the outgoing call charges of the telephone sets 12 to 15 in units of telephone sets. The data memory unit 19 stores information representing telephone sets belonging to one group having the same master-subsidiary relationship. The contents of the data memory unit 19 are registered or deleted by the maintenance personnel of the switching unit 1 or a dial operation using the master telephone set 12 or 13.

Figure 2:
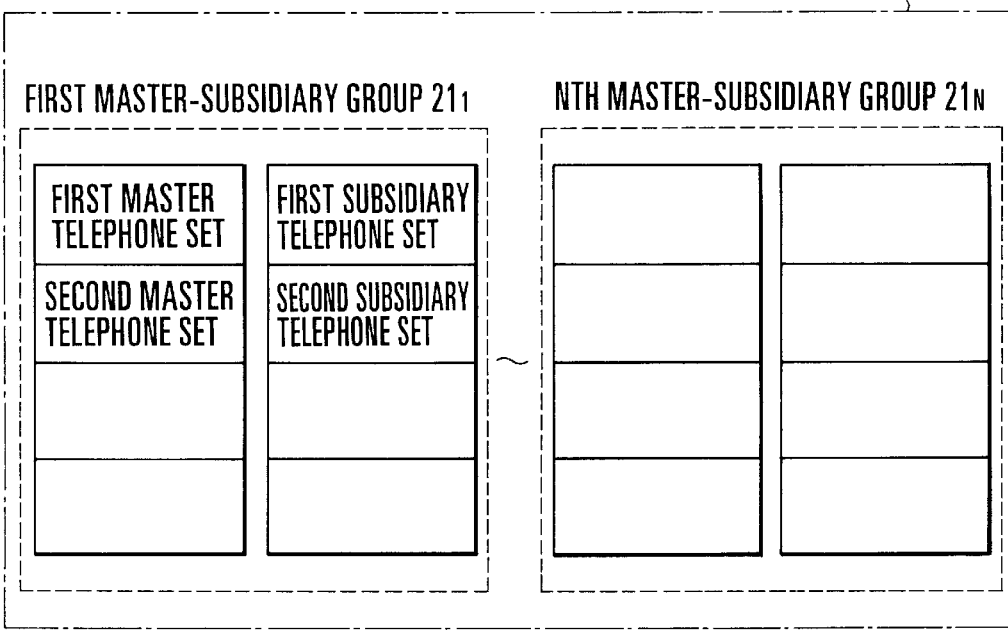
FIG. 2 is a block diagram showing the arrangement of a master-subsidiary memory in a data memory unit shown in FIG. 1.

FIG. 2 shows the general arrangement of a master-subsidiary memory in the data memory unit. A master-subsidiary memory area 19A in the data memory unit 19 shown in FIG. 1 is used to make master and subsidiary telephone sets correspond to each other in units of groups. In respective memory areas of the master-subsidiary memory area 19A, first to Nth master-subsidiary groups $21_1$ to $21_N$ can be registered. In FIG. 1, the master telephone sets 12 and 13 and the subsidiary telephone sets 14 and 15 are registered in the memory area of the first master-subsidiary group $21_1$, and constitute one group.

Figure 3:
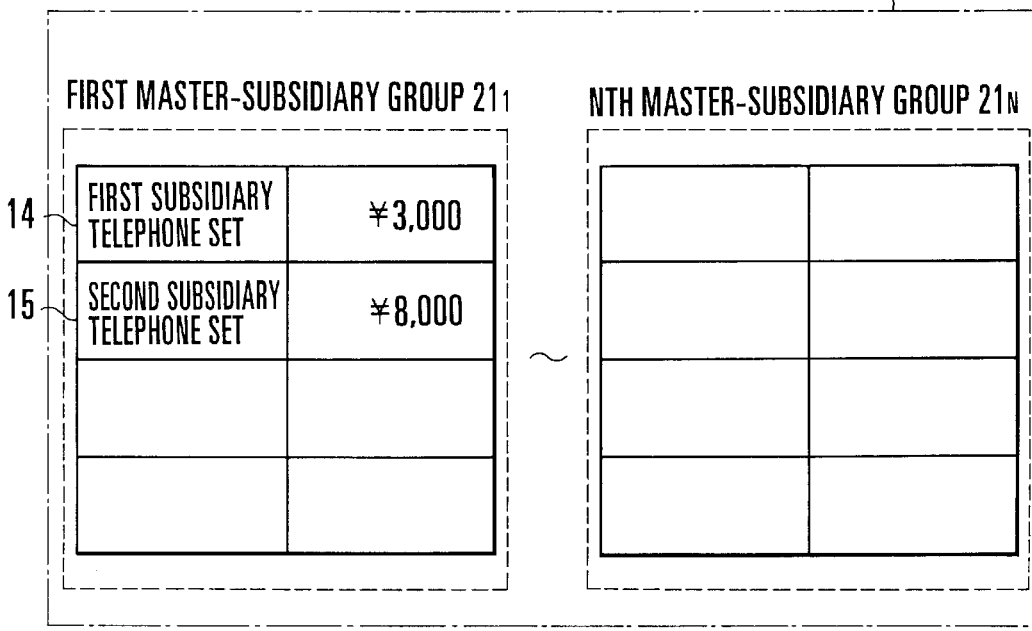
FIG. 3 is a block diagram showing the arrangement of the first memory portion in a warning informing memory area.

FIG. 3 shows the arrangement of a first memory portion $19B_1$ in a warning informing memory area within the data memory unit. The warning informing memory area includes second to fourth memory portions $19B_2$ to $19B_4$ shown in FIGS. 4 to 6 in addition to the first memory portion $19B_1$. A warning is generated by one or a combination of these memory portions.

In the first memory portion $19B_1$ shown in FIG. 3, call charge limits usable for the subsidiary telephone sets 14 and 15 are registered. In FIG. 3, the call charge limits of the subsidiary telephone sets 14 and 15 registered in the first master-subsidiary group $21_1$ are ¥3,000 and ¥8,000, respectively.

Figure 4:
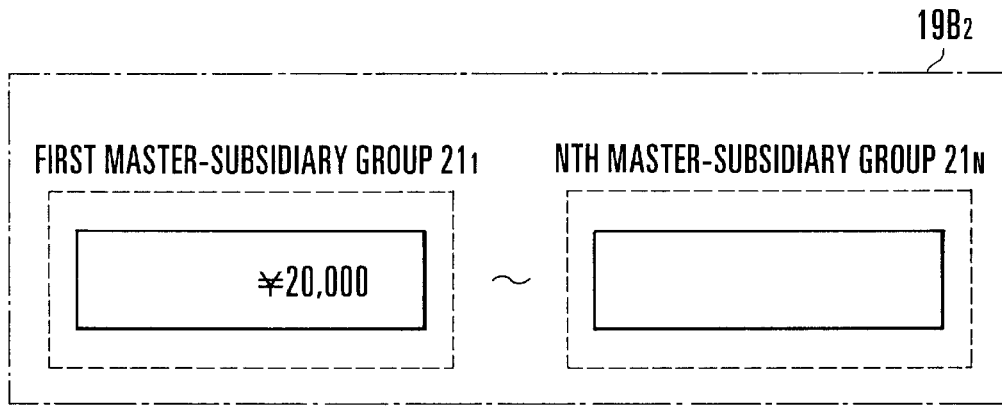
FIG. 4 is a block diagram showing the arrangement of the second memory portion in the warning informing memory area.

FIG. 4 shows the arrangement of the second memory portion $19B_2$ in the warning informing memory area. In the second memory portion $19B_2$, the call charge limit of the whole group is registered for each of the first to Nth master-subsidiary groups $21_1$ to $21_N$. In FIG. 4, the call charge limit usable for the first master-subsidiary group $21_1$ is ¥20,000.

Figure 5:
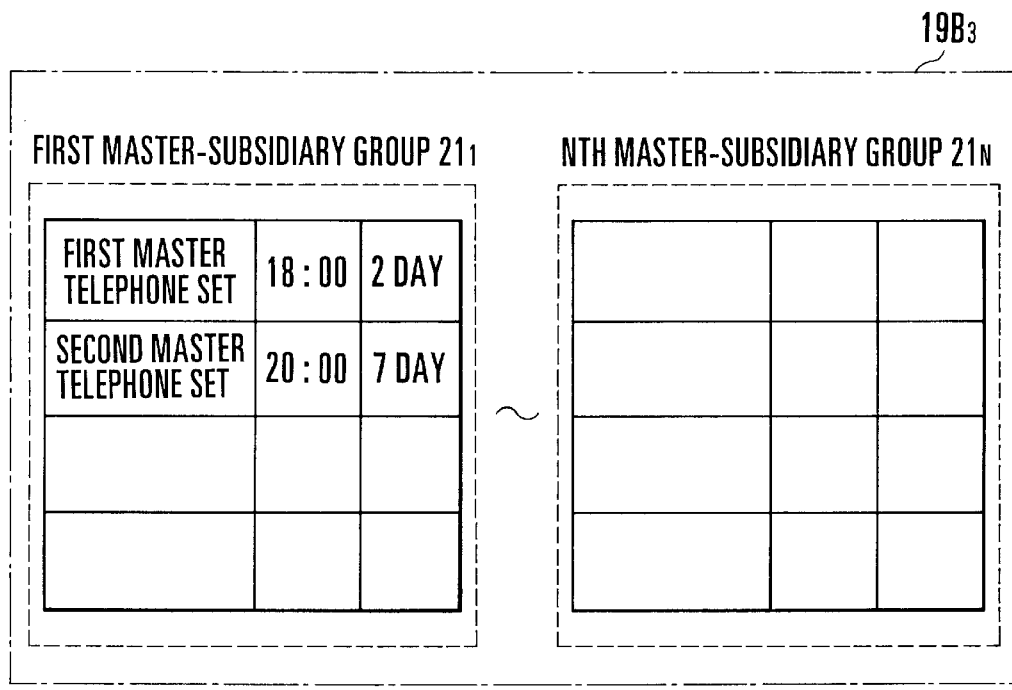
FIG. 5 is a block diagram showing the arrangement of the third memory portion in the warning informing memory area.

FIG. 5 shows the arrangement of the third memory portion $19B_3$ in the warning informing memory area. In the third memory portion $19B_3$, a warning period is registered in correspondence with each master telephone set in order to periodically warn the master telephone set regardless of the communication charge. In FIG. 5, the registered warning period and time are every two days and 18:00 for the master telephone set 12, and every seven days and 20:00 for the master telephone set 13.

FIG. 6 shows the arrangement of the fourth memory portion $19B_4$ in the warning informing memory area. In the fourth memory portion $19B_4$, a unit charge for warning each subsidiary telephone set is registered for each of the first to Nth master-subsidiary groups $21_1$ to $21_N$. Every time the subsidiary telephone set is used by a registered unit charge, a warning is displayed on the display of the master telephone set managing the subsidiary telephone set.

In FIG. 6, the warning is displayed on the master telephone set 12 every time the subsidiary telephone set 14 is used by a communication charge of ¥500 (when the communication charge exceeds ¥500, ¥1,000, ¥1,500, . . . ) The warning is displayed on the master telephone set 13 every time the subsidiary telephone set 15 is used by a communication charge of ¥1,200 (when the communication charge exceeds ¥1,200, ¥2,400, ¥3,600, . . . )

FIG. 7 shows an example of a display on the display 12A of the master telephone set 12. On the display 12A, warning information representing that the communication charge of the subsidiary telephone set 14 exceeds an integer multiple of the unit charge, e.g., ¥3,000, and warning time information are displayed in characters. The contents shown in FIGS. 2 to 6 are registered in the master-subsidiary memory area shown in FIG. 2 and the warning informing memory areas shown in FIGS. 3 to 6 by a registering operation by the switching unit maintenance personnel or a dial operation subsequent to password input from a master telephone set, a public telephone set, or a general telephone set.

Figure 8:
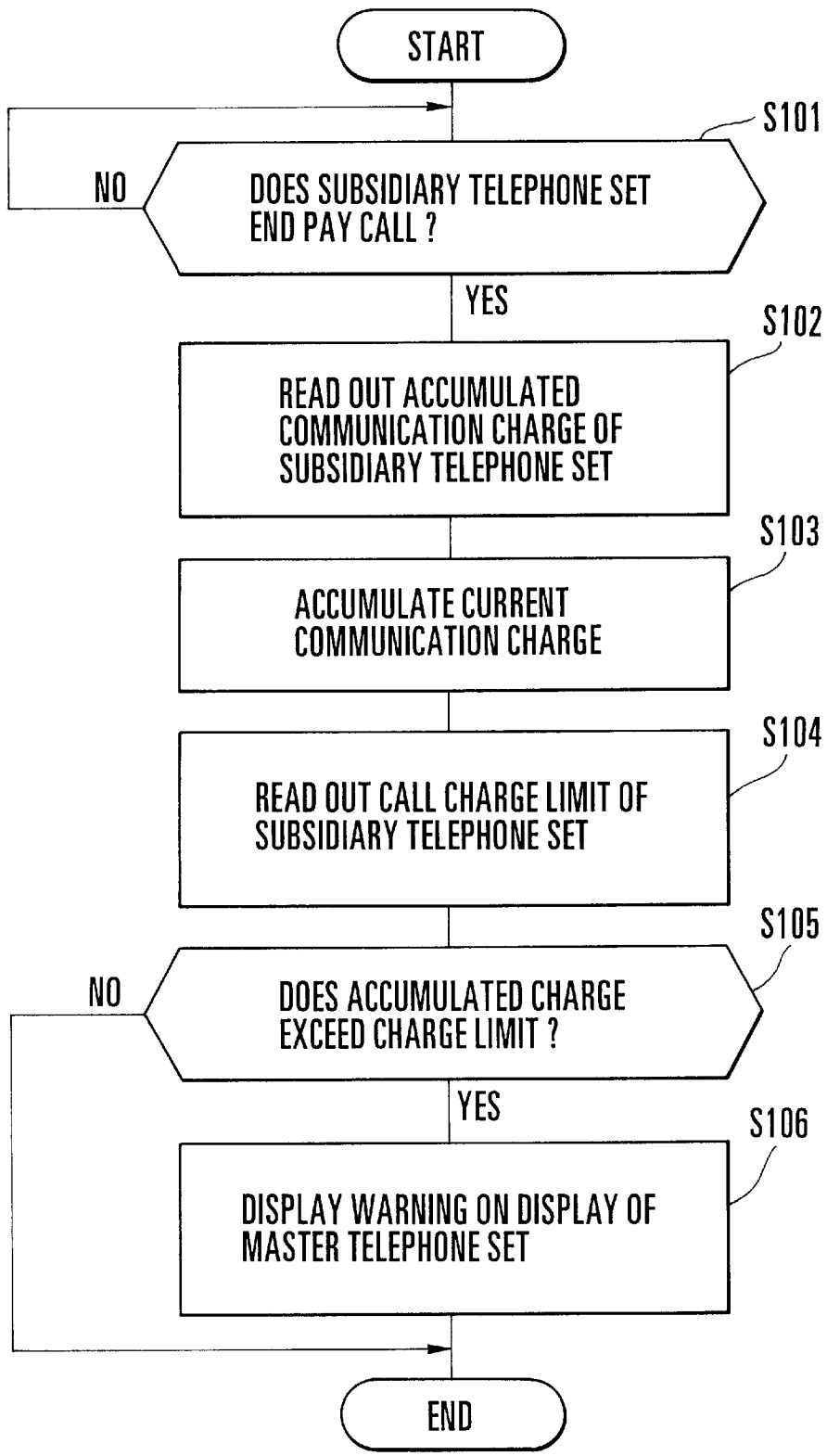
FIG. 8 is a flow chart showing processing of displaying warning information on the master telephone set when the accumulated communication charge of the subsidiary telephone set exceeds the charge limit.

FIG. 8 shows a processing flow of displaying a warning on the master telephone set when the accumulated communication charge of the subsidiary telephone set exceeds the charge limit in the communication charge management system having the above arrangement. Processes shown in FIGS. 8 to 12 are realized by executing programs stored in the ROM 17B of the connection controller 17 shown in FIG. 1 by the CPU 17A.

In FIG. 8, the CPU 17A monitors whether the subsidiary telephone sets 14 and 15 end pay calls (step S101). If YES in step S101, the CPU 17A reads out the past accumulated communication charge of each subsidiary telephone set in the on-hook state (step S102). The CPU 17A accumulates the current communication charge on the readout accumulated communication charge (step S103). The CPU 17A reads out the call charge limit of the target subsidiary telephone set from the first memory portion $19B_1$ (step S104).

Assume that the subsidiary telephone set 14 ends the pay call and is to be managed. In this case, the CPU 17A reads out the call charge limit of the subsidiary telephone set 14, i.e., ¥3,000 from the first memory portion $19B_1$ shown in FIG. 3. The CPU 17A checks whether the accumulated communication charge obtained in step S103 exceeds the readout call charge limit (step S105).

If YES in step S105, the CPU 17A recognizes, from the first master-subsidiary group $21_1$ with reference to the memory area 19A shown in FIG. 2, that a warning is to be displayed on the first and second master telephone sets 12 and 13. On the displays 12A and 13A, the CPU 17A displays a warning that the communication charge of the subsidiary telephone set 14 exceeds the call charge limit (step S106).

This allows the users of the master telephone sets 12 and 13 to appropriately manage the user of the first subsidiary telephone set 14.

Together with displays on the displays 12A and 13A, the CPU 17A may control the main switch 11 to connect the announcement unit 16 to the master telephone sets 12 and 13 and to announce, via the master telephone sets 12 and 13, a voice warning that the communication charge of the subsidiary telephone set 14 exceeds the call charge limit. This voice warning may be announced alone without displaying any warning, and the voice warning may be announced every predetermined time until the CPU 17A receives confirmation inputs from the master telephone sets 12 and 13.

If NO in step S105, the CPU 17A completes processing without displaying any warning.

FIG. 9 shows a processing flow upon making a call by the subsidiary telephone set. Assume that the subsidiary telephone set 14 makes a call. The CPU 17A of the connection controller 17 monitors whether the subsidiary telephone set 14 is set in the off-hook state for a call (step S201). If YES in step S201, the CPU 17A reads out the past accumulated communication charge of the subsidiary telephone set 14, similar to step S102 (step S202). The CPU 17A reads out the call charge limit of the subsidiary telephone set 14, similar to step S104 (step S203).

The CPU 17A checks whether the accumulated communication charge exceeds the call charge limit (step S204). If NO in step S204, i.e., the accumulated communication charge is less than ¥3,000, the CPU 17A normally connects the subsidiary telephone set 14 to a line (step S205) and completes originating control.

If YES in step S204, the CPU 17A checks whether the call destination of the subsidiary telephone set 14 is free of charge (step S206). For example, for a collect call or a free dial, the CPU 17A normally connects the subsidiary telephone set 14 to a line in step S205. The same processing is also performed for an emergency call destination such as a police station or a fire station. If NO in step S206, the CPU 17A determines whether the call destination of the subsidiary telephone set 14 has a master-subsidiary relationship with the subsidiary telephone set 14 in the first memory portion $19B_1$ shown in FIG. 3 (step S207).

In this embodiment, if the subsidiary telephone set 14 makes a call to the master telephone set 12 or 13 or second subsidiary telephone set 15 belonging to the first master-subsidiary group $21_1$, this is home communication free from any restriction. Therefore, the flow advances to step S205 to normally connect the subsidiary telephone set 14 to a line. That is, the telephone set 14 is connected to the terminal of the call destination.

If NO in all steps S204, S206, and S207, the CPU 17A controls the main switch 11 to connect the announcement unit 16 to the first subsidiary telephone set 14. The CPU 17A outputs a voice warning, that origination is restricted, to the subsidiary telephone set 14 (step S208).

FIG. 10 shows a processing flow when the master telephone set requests the connection controller to acquire information about a specific subsidiary telephone set. As described above, every time predetermined warning conditions are satisfied, the CPU 17A automatically displays a warning about the state of a corresponding subsidiary telephone set on the master telephone sets 12 and 13. However, the user can designate a subsidiary telephone set and positively monitor its state without waiting for the warning. This can be implemented by dialing a predetermined specific number on the master telephone set.

In FIG. 10, the CPU 17A receives a specific number to be monitored from the master telephone set 12 (step S301). The CPU 17A receives the telephone number of a subsidiary telephone set to be monitored (step S302). After normally receiving these numbers, the CPU 17A reads out data about the use state of the designated subsidiary telephone set, and displays the use state of the subsidiary telephone set on the display 12A. When a voice output is set, the CPU 17A connects the announcement unit 16 to the master telephone set 12 via the main switch 11, and displays informing contents such as a warning on the display 12A, as described above with reference to FIG. 7 (step S303).

In the above embodiment, when the accumulated communication charge exceeds the call charge limit, the warning is displayed on the display of the master telephone set. In addition, various warnings can be displayed for communication of the subsidiary telephone set.

Figure 11:
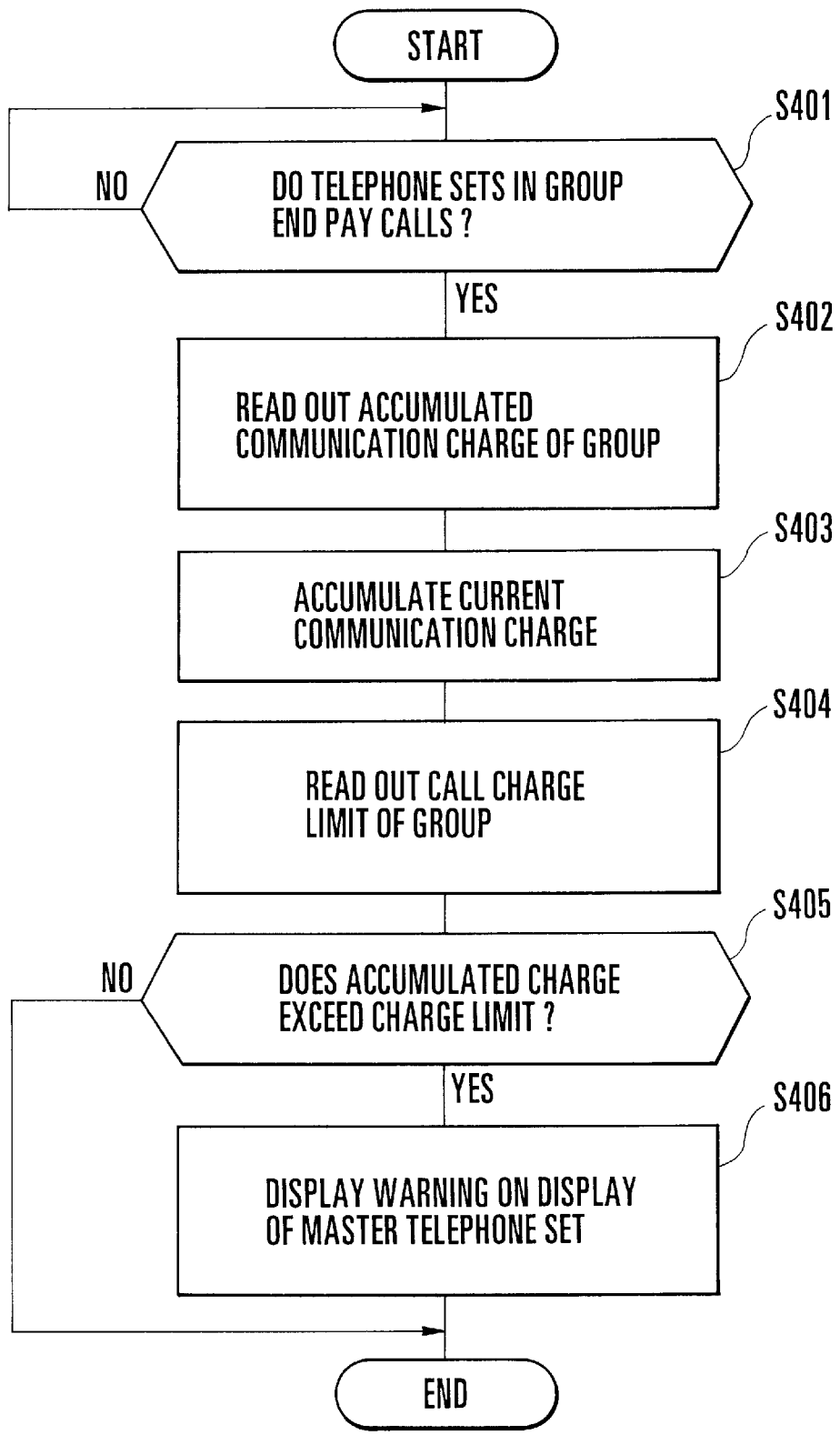
FIG. 11 is a flow chart showing control of managing the communication charge of the whole group.

FIG. 11 shows a control flow of managing the communication charge of the whole group. The CPU 17A monitors whether the master telephone sets 12 and 13 and the subsidiary telephone sets 14 and 15, i.e., all the telephone sets belonging to the first master-subsidiary group $21_1$ end pay calls (step S401). When any telephone set ends the pay call, the CPU 17A reads out the accumulated communication charge of the whole first master-subsidiary group $21_1$ (step S402). Then, the CPU 17A accumulates the current communication charge on the readout accumulated communication charge (step S403). The CPU 17A reads out the call charge limit of the first master-subsidiary group $21_1$ from the first memory portion $19B_1$ shown in FIG. 3 (step S404).

In this case, the CPU 17A reads out a call charge limit of ¥20,000. The CPU 17A checks whether the accumulated charge obtained in step S403 exceeds the call charge limit (step S405). If YES in step S405, the CPU 17A determines, from the first master-subsidiary group $21_1$ with reference to the memory area 19A shown in FIG. 2, that a warning is to be displayed on the first and second master telephone sets 12 and 13. On the displays 12A and 13A, the CPU 17A displays a warning that the total communication charge of the first master-subsidiary group $21_1$ exceeds the call charge limit (step S406).

This allows the users of the master telephone sets 12 and 13 to appropriately manage all the telephone sets belonging to the first master-subsidiary group $21_1$ so as to save subsequent communication.

Together with displays on the displays 12A and 13A, the CPU 17A may connect the announcement unit 16 to the master telephone sets 12 and 13 and the subsidiary telephone sets 14 and 15, and announce a voice warning that the total communication charge of the first master-subsidiary group $21_1$ exceeds the call charge limit.

If NO in step S405, the CPU 17A completes processing without displaying any warning.

In the above embodiment, the communication charge of the whole first master-subsidiary group $21_1$ is read out and determined in step S402. Depending on the group, the total charge of all subsidiary telephone sets except for master telephone sets may be determined.

Figure 12:
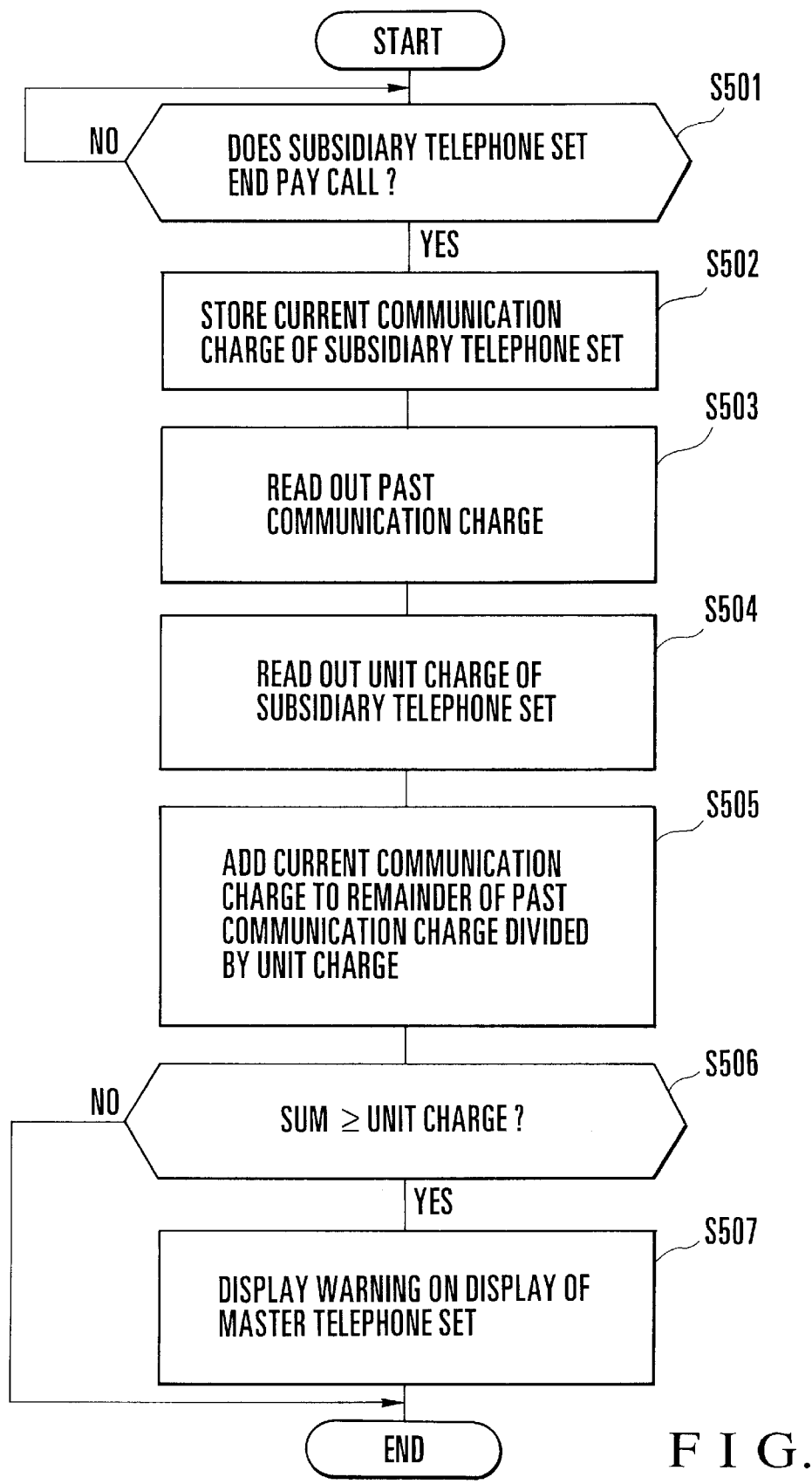
FIG. 12 is a flow chart showing processing of generating a warning every time the communication charge of the subsidiary telephone set exceeds a predetermined unit charge.

FIG. 12 shows a processing flow of generating a warning every time the communication charge of the subsidiary telephone set exceeds a predetermined unit charge. In this case, a warning is displayed on the master telephone sets 12 and 13 every time the communication charge of the subsidiary telephone set 14 or 15 exceeds a unit charge in the fourth memory portion $19B_4$ shown in FIG. 6.

In FIG. 12, the CPU 17A monitors whether the subsidiary telephone sets 14 and 15 end pay calls (step S501). Assume that the subsidiary telephone set 14 ends the pay call. In this case, the CPU 17A obtains the current communication charge of the subsidiary telephone set 14 and stores it in a working memory (not shown) (step S502). The CPU 17A reads out the past accumulated communication charge of the subsidiary telephone set 14 (step S503).

The CPU 17A reads out the unit charge of the telephone set 14 in the first master-subsidiary group from the fourth memory portion $19B_4$ shown in FIG. 6 (step S504), and adds the current communication charge to the remainder of the past communication charge divided by the unit charge (step S505). The CPU 17A determines whether the sum is equal to or more than the unit charge (step S506).

If NO in step S506, the CPU 17A determines that the accumulated communication charge exceeds the unit charge, and displays a warning about the subsidiary telephone set 14 on the master telephone sets 12 and 13 (step S507). If YES in step S506, the CPU 17A completes processing without displaying any warning on the master telephone sets 12 and 13.

In this case, every time the accumulated communication charge of the subsidiary telephone set 14 increases in units of ¥500, a warning that the communication charge of the subsidiary telephone set 14 increases in units of ¥500 is displayed on the master telephone sets 12 and 13. Further, every time the total accumulated communication charge of the master telephone sets 12 and 13 and the subsidiary telephone sets 14 and 15 in the same group exceeds a predetermined unit charge, a warning that the communication charge increases by one unit charge can be displayed on a specific telephone set such as the master telephone sets 12 and 13 using the second memory portion $19B_2$ shown in FIG. 4.

In the above embodiment, the communication charge is obtained upon completion of communication by the subsidiary or master telephone set, and a warning is displayed based on this charge. However, the present invention is not limited to this. The use state of the subsidiary telephone set or the like can be displayed on a corresponding master telephone set at the warning periods of the master telephone sets 12 and 13 which are stored in the third memory portion $19B_3$ shown in FIG. 5.

In addition to the period of the master telephone sets 12 and 13, the warning period may be defined for the subsidiary telephone sets 14 and 15, and the use state of the subsidiary telephone set or the like may be displayed on a predetermined master telephone set (master telephone set 12 or 13 or both of them) every period.

In the above embodiment, a warning is displayed using characters on the display of the master telephone set. Alternatively, lamps may be properly arranged on the master telephone set, and their ON/OFF states may be controlled to make a warning. When the master telephone set is a telephone set incorporating a personal computer or a television telephone set, a warning may be made using images such as an icon. When the master telephone set is equipped with a facsimile communication function, warning contents using characters or images can be printed out on a paper sheet.

To use the display of the master telephone set for various purposes, display contents must be erased from the display in displaying other contents even if the communication charge is displayed. When the display of the master telephone set is dedicated to the communication charge, the communication charge of one or a plurality of subsidiary telephone sets can always be displayed.

In the above embodiment, whether a pay call is performed is checked. This can be implemented by using a database in order to determine the pay call by analyzing the telephone number of a call destination. The database for the accumulated charge can also be used for charging index information for charging such as ¥10/min or ¥10/2 min. Using general charging index information allows to construct the communication charge management system without any data equipment.

As has been described above, according to the present invention, a master telephone set on a managing side is informed of the communication charge of a slave telephone set (subsidiary telephone set) on a managed side. By setting the master-slave relationship between telephone sets, the master telephone set can appropriately manage the communication charge of the subsidiary telephone set under management.

The communication charge by communication of the telephone set is accumulated. When the accumulated charge reaches the charge limit set by the communication charge limit setting means, subsequent communication is permitted for only a free dial party. Compared to the case of one-sidedly restricting communication, the subsidiary telephone set can be used in a predetermined case such as an emergency, which is practically convenient.

Predetermined conditions are set for monitoring the communication charge of the subsidiary telephone set, and the master telephone set is informed of the communication charge of the subsidiary telephone set every time these conditions are established. Therefore, the master telephone set can grasp the state of the subsidiary telephone set at time useful for management, and efficiently manage the communication charge of the subsidiary telephone set.

Since the current accumulated communication charge of a desired subsidiary telephone set is displayed on the master telephone set upon reception of a request from the master telephone set, the charge is not one-sidedly displayed regardless of the will on the subsidiary telephone set side, and the privacy of the subsidiary telephone set can be ensured.

When the accumulated communication charge of the subsidiary telephone set reaches the set charge limit, a subsequent call of this subsidiary telephone set is permitted for only a master telephone set having a specific relationship with this subsidiary telephone set, and a subsidiary telephone set having the same relationship. For example, communication is permitted without any limitation within a specific group such as a family, and convenience by communication within the group can be ensured.

What is claimed is:

1. A communication charge management system comprising:
   at least one master telephone set serving as a managing telephone set;
   at least one slave telephone set serving as a telephone set managed by said master telephone set;
   charge informing means for informing said master telephone set of a communication charge in communication of said slave telephone set; and
   display means, associated with said at least one master telephone set, for displaying a warning message indicating that said at least one slave telephone set has exceeded a charge limit.

2. A system according to claim 1, wherein said system further comprises condition setting means for setting a predetermined condition for monitoring the communication charge of said slave telephone set, and
   said charge informing means informs said master telephone set of the communication charge in communication of said slave telephone set every time the condition set by said condition setting means is established.

3. A system according to claim 2, wherein said condition setting means sets a communication charge upper limit for said slave telephone set as a predetermined condition, and
   said charge informing means performs an informing operation when an accumulated communication charge exceeds the communication charge upper limit set by said condition setting means.

4. A system according to claim 2, wherein said condition setting means sets a period for monitoring the communication charge of said slave telephone set as a predetermined condition, and
   said charge informing means performs an informing operation on the basis of the period set by said condition setting means.

5. A system according to claim 2, wherein said condition setting means sets a unit charge for said slave telephone set as a predetermined condition, and
   said charge informing performs an informing operation when an accumulated communication charge exceeds an integer multiple of the unit charge set by said condition setting means.

6. A system according to claim 1, wherein said charge informing means comprises:
   accumulated charge calculating means for calculating an accumulated communication charge of said slave telephone set;
   informing request receiving means for receiving an informing request from said master telephone set and informing said master telephone set of the accumulated communication charge of a designated slave telephone set,
   said display means further for displaying the accumulated communication charge of said slave telephone set informed by said informing request receiving means on said master telephone set which has sent the informing request.

7. A communication charge management system comprising:
   at least one master telephone set serving as a managing telephone set;
   at least one slave telephone set serving as a telephone set managed by said master telephone set;
   charge informing means for informing said master telephone set of a communication charge in communication of said slave telephone set;
   accumulating means for accumulating communication charges accompanying an outgoing call of said slave telephone set every time communication ends;
   charge upper limit setting means for setting a communication charge upper limit for an outgoing call of said slave telephone set; and
   call permitting means for permitting a subsequent call from said slave telephone set whose accumulated charge reaches the charge upper limit to only master and slave telephone sets having a specific relationship when the accumulated charge by said accumulating means reaches the charge upper limit set by said charge upper limit setting means.

8. A system according to claim 1, wherein said system further comprises setting means for setting a relationship between said master and slave telephone sets in advance, and
   said informing means determines a master telephone set to be informed with reference to setting information of said setting means.

9. A communication charge management system comprising:
   accumulating means for accumulating communication charges accompanying an outgoing call of a slave telephone set every time communication ends;
   setting means for setting a communication charge upper limit for an outgoing call of the telephone set;
   charging determining means for determining on the basis of a relationship with a communication partner whether a communication charge is required upon an outgoing call of the telephone set; and
   communication permitting means for permitting subsequent communication to only a communication partner determined by said charging determining means that no communication charge is required when the accumulated charge by said accumulating means reaches the charge upper limit set by said charge upper limit setting means.

10. A communication charge management system comprising:

a plurality of master telephone sets serving as managing telephone sets;

a plurality of slave telephone sets serving as telephone sets managed by said master telephone sets;

accumulating means for individually accumulating communication charges of said slave telephone sets;

first setting means for setting a relationship between said master and slave telephone sets in advance;

second setting means for individually setting communication charge upper limits of said slave telephone sets;

determining means for determining whether an accumulated communication charge of each slave telephone set by said accumulating means exceeds the charge upper limit set by said second setting means;

informing control means for informing a master telephone set having a specific relationship of warning information with reference to setting information by said first setting means when the accumulated communication charge of said slave telephone set exceeds the charge upper limit; and display means associated with said master telephone set for displaying said warning information.

* * * * *